(12) United States Patent
Miyazaki et al.

(10) Patent No.: US 10,557,631 B2
(45) Date of Patent: *Feb. 11, 2020

(54) EXHAUST GAS TREATMENT APPARATUS

(71) Applicant: EBARA CORPORATION, Tokyo (JP)

(72) Inventors: Kazutomo Miyazaki, Tokyo (JP); Tetsuo Komai, Tokyo (JP); Seiji Kashiwagi, Tokyo (JP)

(73) Assignee: EBARA CORPORATION, Tokyo (JP)

( * ) Notice: Subject to any disclaimer, the term of this patent is extended or adjusted under 35 U.S.C. 154(b) by 65 days.

This patent is subject to a terminal disclaimer.

(21) Appl. No.: 16/049,927

(22) Filed: Jul. 31, 2018

(65) Prior Publication Data
US 2019/0041058 A1 Feb. 7, 2019

(30) Foreign Application Priority Data

Aug. 3, 2017 (JP) .................. 2017-150513
Jul. 9, 2018 (JP) .................. 2018-129806

(51) Int. Cl.
*F23G 7/06* (2006.01)
*F23G 5/32* (2006.01)
*F23G 5/24* (2006.01)
*F23G 5/12* (2006.01)

(52) U.S. Cl.
CPC ............... *F23G 7/065* (2013.01); *F23G 5/12* (2013.01); *F23G 5/24* (2013.01); *F23G 5/32* (2013.01); *F23G 2209/141* (2013.01)

(58) Field of Classification Search
CPC ... F23G 7/065; F23G 5/12; F23G 5/24; F23G 5/32

USPC ........................................................... 431/5
See application file for complete search history.

(56) References Cited

U.S. PATENT DOCUMENTS

| 6,736,635 | B1 * | 5/2004 | Takemura | F23G 5/32 110/213 |
|---|---|---|---|---|
| 7,607,914 | B2 * | 10/2009 | Komai | F23C 5/32 431/170 |
| 7,654,819 | B2 * | 2/2010 | Okada | F23C 3/002 431/173 |
| 8,591,819 | B2 * | 11/2013 | Kawamura | F23G 5/24 422/168 |
| 9,822,974 | B2 * | 11/2017 | Kawamura | F04B 37/14 |

(Continued)

FOREIGN PATENT DOCUMENTS

| JP | 2000193224 A | * | 7/2009 | ............... F23G 5/32 |
|---|---|---|---|---|
| JP | 4937886 B2 | | 5/2012 | |

*Primary Examiner* — Gregory L Huson
*Assistant Examiner* — Nikhil P Mashruwala
(74) *Attorney, Agent, or Firm* — Pearne & Gordon LLP

(57) ABSTRACT

An exhaust gas treatment apparatus for treating an exhaust gas discharged from an EUV (Extreme Ultra Violet) exposure equipment by combustion treatment to make the exhaust gas harmless is disclosed. The exhaust gas treatment apparatus includes a cylindrical combustion chamber configured to combust a processing gas containing hydrogen, and a processing gas nozzle and an oxidizing gas nozzle provided on the combustion chamber and configured to blow the processing gas and an oxidizing gas, respectively, in a tangential direction to an inner circumferential surface of the combustion chamber, wherein the processing gas nozzle and the oxidizing gas nozzle are positioned in the same plane perpendicular to an axis of the combustion chamber.

14 Claims, 8 Drawing Sheets

(56) References Cited

U.S. PATENT DOCUMENTS

| 10,174,942 B2* | 1/2019 | Kashiwagi | F23G 7/065 |
| 2002/0045141 A1* | 4/2002 | Kim | F23C 7/002 |
| | | | 431/5 |

* cited by examiner

EXHAUST GAS TREATMENT APPARATUS

CROSS REFERENCE TO RELATED APPLICATIONS

This document claims priorities to Japanese Patent Application Number 2017-150513 filed Aug. 3, 2017 and Japanese Patent Application Number 2018-129806 filed Jul. 9, 2018, the entire contents of which are hereby incorporated by reference.

BACKGROUND

High integration of a semiconductor integrated circuit such as MPU or DRAM and miniaturization required for the high integration of the semiconductor integrated circuit have been realized by a technology of shortening wavelength in an optical system of the exposure equipment for transferring a circuit pattern, and a technology of a liquid immersion, a multiple patterning and the like.

Although it is said that shortening of wavelength in the optical system has been approaching the technological limit, in recent years, an EUV (Extreme Ultra Violet) exposure equipment is being put to practical use. Heretofore, shortening of wavelength has been developed gradually over several decades from 365 nm through 248 nm to 193 nm (currently). However, the EUV (Extreme Ultra Violet) is a technology for advancing the shortening of wavelength straight to 13.5 nm, and thus the EUV has various technological hurdles that need to be overcome.

One of the technological hurdles is a measure for pollution control within the apparatus. The EUV exposure equipment is a super-precision equipment, and particularly performance of the EUV exposure equipment is drastically lowered by entry of a foreign matter into the optical system. The EUV exposure equipment comprises a light source unit for emitting an EUV, and an exposure unit for exposing wafers with the EUV emitted from the light source unit. It is known that oxide of tin (Sn) produced by irradiation of laser onto a target in the light source unit and organic material separated from light-sensitive material (resist) in the exposure unit are typical contamination sources. Because these oxide and organic material are inevitably produced by the operation of the apparatus, they cannot be prevented from being produced.

As a measure against these contamination sources, there is a method of using a hydrogen gas. The oxide of tin is removed as gaseous hydride by using the hydrogen gas at a rate of several hundred liters per minute (L/min) in the light source unit, and the organic material is gasified and removed by using the hydrogen gas at a rate of several dozen liters per minute (L/min) in the exposure unit. Although the used hydrogen gas is mostly unreacted, such hydrogen gas is discharged from the apparatus as a carrier of the removed contaminant. In this case, the discharged hydrogen gas varies greatly in amount depending on the presence of operation process for evacuating the exposure unit to produce a vacuum therein, independent operation of the light source unit and the exposure unit, respectively, at some level, or periodic maintenance.

Therefore, a processing gas (exhaust gas) containing the hydrogen gas which has a fluctuation range from a hundred and several tens liters per minute (L/min) to several hundred liters per minute (L/min) is discharged from the EUV exposure equipment.

The processing gas (exhaust gas) discharged from the manufacturing apparatus for manufacturing semiconductor devices or the like is generally introduced into an exhaust gas treatment apparatus where the exhaust gas is treated and made harmless, and is then emitted into the atmosphere. As this treatment method for making the exhaust gas harmless, as disclosed in Japanese Patent No. 4937886 or the like, there has been widely used a combustion-type exhaust gas treatment apparatus in which a fuel (fuel gas) and an oxidizing gas (oxygen-containing gas) are mixed to combust the fuel and to form a flame, and a processing gas (exhaust gas) is mixed with the flame to perform combustion treatment of the processing gas.

However, the processing gas (exhaust gas) discharged from the EUV exposure equipment contains a large amount of hydrogen gas, and thus there is a possibility that the processing gas can be treated by combustion only by supplying the oxidizing gas (oxygen-containing gas) without supplying the fuel.

Hydrogen has characteristics of a fast combustion speed and a wide combustion range (being combustible even in high concentration and in low concentration) particularly among combustible gases. Therefore, there is a possibility that hydrogen is rapidly combusted to form a local high-temperature part immediately after it flows into a combustion chamber, thus causing heat damage of the combustion chamber. As an inflow amount of hydrogen is larger, the possibility of heat damage of the combustion chamber is higher. As a common practice, the heat damage can be prevented by using a large amount of oxidizing gas (air) and combusting hydrogen. However, in this case, a combustion chamber having a large capacity is required and an amount of combustion gas increases, resulting in a large-size apparatus. Further, it is necessary to adjust an amount of the oxidizing gas to a flow rate of hydrogen. This is because when a small amount of hydrogen gas is mixed with a large amount of oxidizing gas and is combusted, if the concentration of hydrogen gas is lower than a lower limit of combustible concentration (in the case of air-hydrogen mixture, hydrogen concentration is 4%), the hydrogen gas cannot be combusted.

However, because the flow rate of hydrogen varies according to operating condition of the EUV exposure equipment, it is difficult to adjust the amount of oxidizing gas to the flow rate of hydrogen. Therefore, it is necessary to combust a large amount of hydrogen by a minimum necessary amount of oxidizing gas, and thus it is necessary to take a measure against the heat damage of the combustion chamber.

As a combustion method which can combust a processing gas (exhaust gas) containing a large amount of hydrogen discharged from the EUV exposure equipment and has a potential capable of preventing heat damage of the combustion chamber, the present inventors have conceived a thermally-insulated mixed combustion method in which a cylindrical mixed flame of a mixture of two kinds of gases which is distant from the inner wall of the combustion chamber is formed by blowing a processing gas containing hydrogen and an oxidizing gas into the combustion chamber, respectively, in a tangential direction to the inner circumferential surface of the combustion chamber.

SUMMARY OF THE INVENTION

According to an embodiment, there is provided an exhaust gas treatment apparatus which can prevent heat damage of a combustion chamber by forming a cylindrical mixed flame of a mixture of two kinds of gases which is distant from an inner wall of the combustion chamber when a processing gas containing hydrogen is treated in a combustion-type exhaust gas treatment apparatus, by means of blowing the processing gas and the oxidizing gas into the combustion chamber, respectively, in a tangential direction to the inner circumferential surface of the combustion chamber.

Embodiments, which will be described below, relate to an exhaust gas treatment apparatus for treating an exhaust gas, discharged from a manufacturing apparatus for manufacturing semiconductor devices or the like, by combustion treatment to make the exhaust gas harmless, and more particularly to an exhaust gas treatment apparatus for treating an exhaust gas discharged from an EUV (Extreme Ultra Violet) exposure equipment by combustion treatment to make the exhaust gas harmless.

In an embodiment, there is provided an exhaust gas treatment apparatus for treating a processing gas containing hydrogen by combustion treatment to make the processing gas harmless, the exhaust gas treatment apparatus comprising: a cylindrical combustion chamber configured to combust a processing gas containing hydrogen; and a processing gas nozzle and an oxidizing gas nozzle provided on the combustion chamber and configured to blow the processing gas and an oxidizing gas, respectively, in a tangential direction to an inner circumferential surface of the combustion chamber; wherein the processing gas nozzle and the oxidizing gas nozzle are positioned in the same plane perpendicular to an axis of the combustion chamber. Here, "the processing gas nozzle and the oxidizing gas nozzle are positioned in the same plane" is defined as "portions of openings at the inner circumferential surface side of the combustion chamber in the processing gas nozzle and the oxidizing gas nozzle are positioned in the same plane."

According to the embodiment, by blowing the processing gas and the oxidizing gas into the combustion chamber, respectively, in a tangential direction to the inner circumferential surface of the combustion chamber to form a cylindrical mixed flame, a distribution in which the two kinds of unburned gases mixed together and having a heavy weight and a low temperature are positioned at an outer part of the cylindrical mixed flame, and a gas having a light weight and a high temperature after the two kinds of gases mixed together are burned is positioned at an inner part of the cylindrical mixed flame is formed by a swirling centrifugal force. Therefore, the cylindrical mixed flame becomes in a state where the cylindrical mixed flame is covered with the two kinds of unburned gases mixed together and having a low temperature and is thus thermally self-insulated, and hence the combustion flame is not brought in direct contact with the inner wall of the combustion chamber which is less susceptible to heat damage.

In an embodiment, a cooling water supply pipe is connected to the oxidizing gas nozzle, and the oxidizing gas is blown together with cooling water in the tangential direction to the inner circumferential surface of the combustion chamber from the oxidizing gas nozzle.

According to the embodiment, the water droplets of cooling water which have been blown together with the oxidizing gas into the combustion chamber are heavier than the gases, and thus the water droplets of cooling water circle around the location closer to the wall surface than the two kinds of unburned gases mixed together in the cylindrical mixed flame, thus not becoming an obstacle to combustion. Then, the water droplets of cooling water cool the inner wall of the combustion chamber during circling. Thus, even if a large amount of hydrogen is contained in the processing gas, a local high-temperature part is not formed in the combustion chamber, and thus heat damage of the combustion chamber can be prevented while ensuring gas treatment performance.

In an embodiment, the cooling water is turned into water droplets by allowing the cooling water supplied from the cooling water supply pipe to merge into the oxidizing gas flowing in the oxidizing gas nozzle, and the oxidizing gas containing the water droplets of the cooling water is blown into the combustion chamber.

In an embodiment, the exhaust gas treatment apparatus further comprises a cooling jacket provided in an upper wall of the combustion chamber and configured to cool the upper wall by supplying cooling water.

In an embodiment, the cooling water discharged from the cooling jacket is supplied to the cooling water supply pipe.

In an embodiment, a check valve is provided in an oxidizing gas supply line for supplying the oxidizing gas to the oxidizing gas nozzle to prevent the processing gas in the combustion chamber from flowing back into the oxidizing gas supply line.

In an embodiment, a check valve is provided in the cooling water supply pipe to prevent the processing gas in the combustion chamber from flowing back into the cooling water supply pipe.

In an embodiment, the processing gas containing hydrogen comprises an exhaust gas discharged from an EUV exposure equipment.

In an embodiment, there is provided an exhaust gas treatment method for treating a processing gas containing hydrogen by combustion treatment to make the processing gas harmless, the exhaust gas treatment method comprising: providing a cylindrical combustion chamber for combusting a processing gas containing hydrogen; and blowing the processing gas and an oxidizing gas, respectively, in a tangential direction to an inner circumferential surface of the combustion chamber from a processing gas nozzle and an oxidizing gas nozzle positioned in the same plane perpendicular to an axis of the combustion chamber to form a swirling flow of a mixture of two kinds of the processing gas and the oxidizing gas.

In an embodiment, cooling water is supplied to the oxidizing gas nozzle, whereby the oxidizing gas is blown together with the cooling water in the tangential direction to the inner circumferential surface of the combustion chamber from the oxidizing gas nozzle.

In an embodiment, the cooling water is turned into water droplets by allowing the cooling water to merge into the oxidizing gas flowing in the oxidizing gas nozzle, and the oxidizing gas containing the water droplets of the cooling water is blown into the combustion chamber.

In an embodiment, cooling water is supplied into an upper wall of the combustion chamber to cool the upper wall.

In an embodiment, the cooling water after cooling the upper wall of the combustion chamber is supplied to the oxidizing gas nozzle.

In an embodiment, the processing gas containing hydrogen comprises an exhaust gas discharged from an EUV exposure equipment.

In an embodiment, water is supplied from a water supply nozzle at a location distant in an axial direction of the combustion chamber from a blowing position of the processing gas and the oxidizing gas to form a water film on the inner circumferential surface of the combustion chamber.

In an embodiment, the water is ejected in a tangential direction to the inner circumferential surface of a water reservoir from the water supply nozzle to form a water film comprising a swirling flow having a water surface which is inclined obliquely downward from a radially outer side toward a radially inner side.

According to the above-described embodiments, by blowing the processing gas and the oxidizing gas into the combustion chamber, respectively, in a tangential direction to the inner circumferential surface of the combustion chamber to form a cylindrical mixed flame, a distribution in which the two kinds of unburned gases mixed together and having a heavy weight and a low temperature are positioned at an outer part of the cylindrical mixed flame, and a gas having a light weight and a high temperature after the two kinds of gases mixed together are burned is positioned at an inner part of the cylindrical mixed flame is formed by a swirling centrifugal force. Therefore, the cylindrical mixed flame becomes in a state where the cylindrical mixed flame is covered with the two kinds of unburned gases mixed together and having a low temperature and is thus thermally self-insulated, and hence the combustion flame is not brought in direct contact with the inner wall of the combustion chamber which is less susceptible to heat damage.

Further, according to the above-described embodiments, the water droplets of cooling water which have been blown together with the oxidizing gas into the combustion chamber are heavier than the gases, and thus the water droplets of cooling water circle around the location closer to the wall surface than the two kinds of unburned gases mixed together in the cylindrical mixed flame, thus not becoming an obstacle to combustion. Then, the water droplets of cooling water cool the area close to the inner wall of the combustion chamber during circling. Thus, even if a large amount of hydrogen is contained in the processing gas, hydrogen in the processing gas is not rapidly combusted and a local high-temperature part is not formed in the combustion chamber, and thus heat damage of the combustion chamber can be prevented.

DESCRIPTION OF EMBODIMENTS

Figure 1:
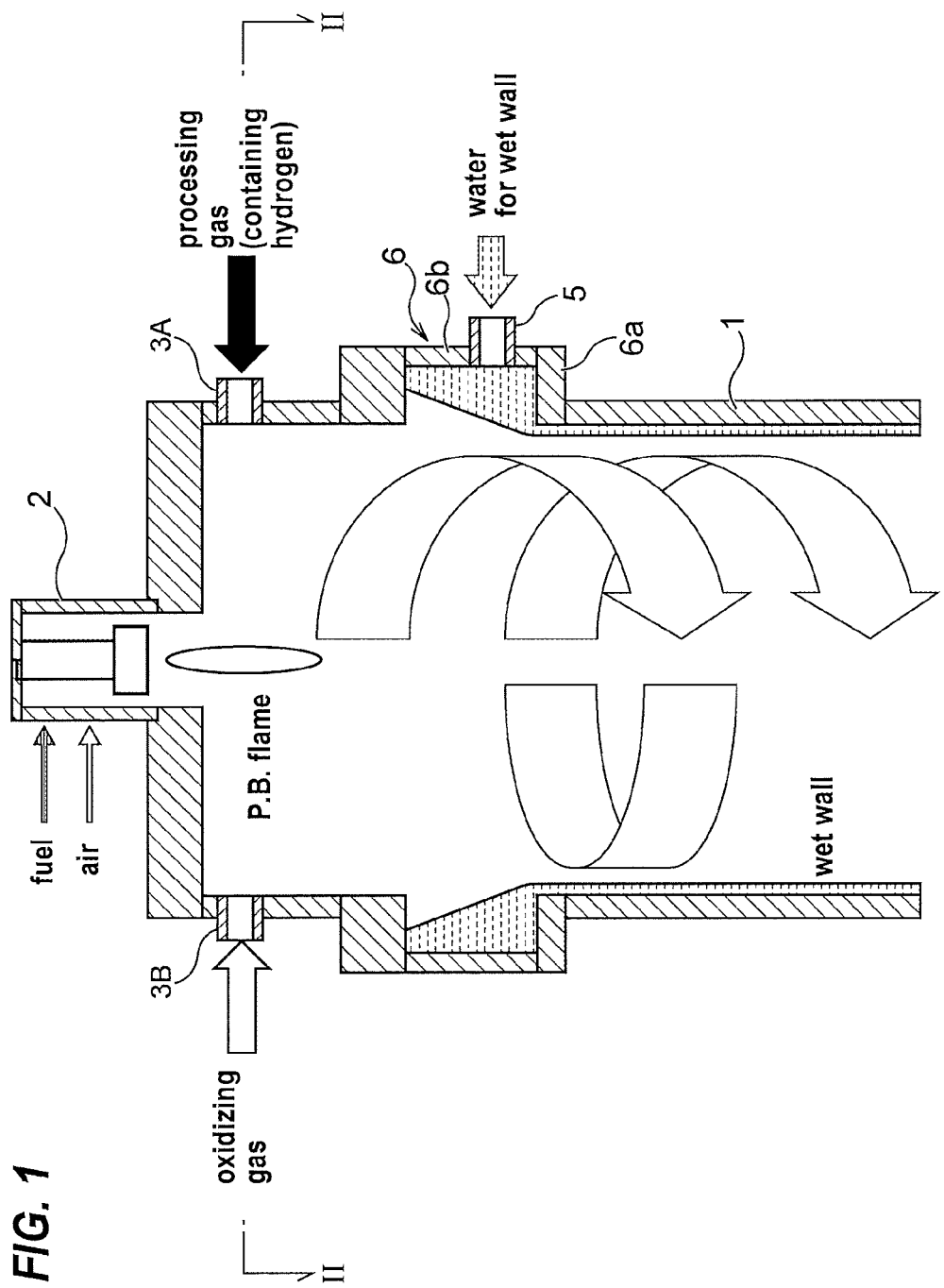
FIG. 1 is a schematic cross-sectional view showing a structural example of a combustion chamber of an exhaust gas treatment apparatus according to an embodiment.

An exhaust gas treatment apparatus according to embodiments will be described with reference to FIGS. 1 through 9. In FIGS. 1 through 9, identical or corresponding parts are denoted by identical or corresponding reference numerals throughout views, and will not be described in duplication. In the embodiments, an exhaust gas treatment apparatus for treating an exhaust gas discharged from an EUV exposure equipment by combustion treatment to make the exhaust gas harmless will be described.

FIG. 1 is a schematic cross-sectional view showing a structural example of a combustion chamber of the exhaust gas treatment apparatus according to an embodiment. A combustion chamber 1 is configured to be a cylindrical container-shaped combustion chamber having one end (an upper end in the illustrated example) which is closed and the other end (a lower end in the illustrated example) which is open. The cylindrical container-shaped combustion chamber 1 is configured so that a processing gas (exhaust gas) and an oxidizing gas (oxygen-containing gas) are blown into the combustion chamber 1 in the vicinity of the closed end portion.

A pilot burner 2 for ignition and pilot light is provided at the closed end portion of the combustion chamber 1, and a fuel and air are supplied to the pilot burner 2. In FIG. 1, a cleaning unit or the like located below the combustion chamber 1 is omitted from the illustration.

Figure 2:
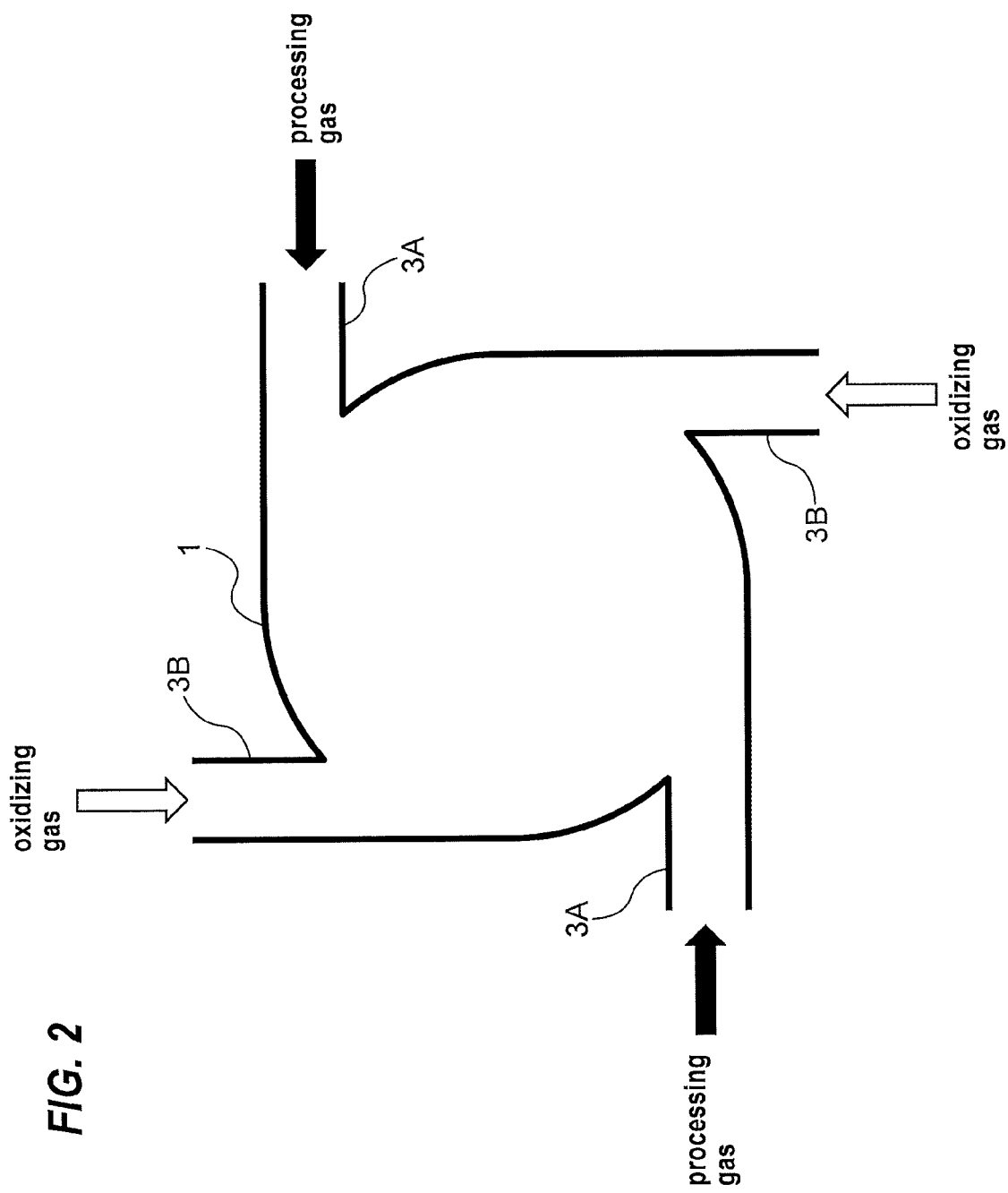
FIG. 2 is a cross-sectional view taken along line II-II of FIG. 1.

FIG. 2 is a cross-sectional view taken along line II-II of FIG. 1. As shown in FIG. 2, a processing gas nozzle 3A for blowing a processing gas (exhaust gas) and an oxidizing gas nozzle 3B for blowing an oxidizing gas (oxygen-containing gas) are provided, respectively, in a tangential direction to an inner circumferential surface of the combustion chamber 1. In the example shown in FIG. 2, two processing gas nozzles 3A and two oxidizing gas nozzle 3B are provided. However, the number of respective nozzles 3A and 3B can be changed properly according to the size of the combustion chamber, the installation space, and the like. The processing gas nozzle 3A for blowing the processing gas and the oxidizing gas nozzle 3B for blowing the oxidizing gas are positioned in the same plane perpendicular to an axis of the cylindrical combustion chamber 1. Here, "the processing gas nozzle 3A and the oxidizing gas nozzle 3B are positioned in the same plane" is defined as "portions of openings at the inner circumferential surface side of the combustion chamber in the processing gas nozzle 3A and the oxidizing gas nozzle 3B are positioned in the same plane."

As shown in FIG. 1, a water supply nozzle 5 for supplying water which forms a wet wall (water film) on the inner wall surface of the combustion chamber 1 is provided on the combustion chamber 1 at a location slightly below the blowing position of the processing gas and the oxidizing gas. The water supply nozzle 5 is provided in a water reservoir 6 extending radially outward from a side wall of the combustion chamber 1. The water reservoir 6 comprises an annular bottom plate 6a which extends radially outward from the side wall of the combustion chamber 1 and forms a bottom surface of the water reservoir 6, and a cylindrical side plate 6b which extends in a substantially vertical direction from an outer circumferential edge of the bottom plate 6 and forms a side wall of the water reservoir 6. The water supply nozzle 5 is fixed to the side plate 6b. The water supply nozzle 5 is arranged so as to eject water in a tangential direction to an inner circumferential surface of the water reservoir 6. By ejecting water in a tangential direction to the inner circumferential surface of the water reservoir 6 from the water supply nozzle 5, a water film comprising a swirling flow having a water surface which is inclined obliquely downward from a radially outer side toward a radially inner side is formed in the water reservoir 6 by ejecting water from the water supply nozzle 5 in a tangential direction to an inner circumferential surface of the water reservoir 6. Then, the water film flows out from the lower end and the radially inner end of the swirling flow (water film) having the inclined water surface, i.e., from the radially inner end of the bottom plate 6a of the water reservoir 6, and flows down along the inner wall of the combustion chamber 1 to form a wet wall (water film) on the inner wall of the combustion chamber 1.

Next, in the combustion chamber 1 configured as shown in FIGS. 1 and 2, the processing gas and the oxidizing gas are blown at a flow velocity equal to or higher than a combustion velocity of the flame, respectively, in a tangential direction to the inner circumferential surface of the combustion chamber 1 from the processing gas nozzles 3A and the oxidizing gas nozzles 3B. Thus, a cylindrical mixed flame of a mixture of the two kinds of gases which is distant from the inner wall of the combustion chamber 1 is formed. The cylindrical mixed flame is formed in an axial direction of the combustion chamber 1. By blowing the two kinds of gases, respectively, in a tangential direction, a distribution in which the two kinds of unburned gases mixed together and having a heavy weight and a low temperature are positioned at an outer part of the cylindrical mixed flame, and a gas having a light weight and a high temperature after the two kinds of gases mixed together are burned is positioned at an inner part of the cylindrical mixed flame is formed by a swirling centrifugal force. Therefore, the cylindrical mixed flame becomes in a state where the cylindrical mixed flame is covered with the two kinds of unburned gases mixed together and having a low temperature and is thus thermally self-insulated, and hence the combustion flame is not brought in direct contact with the inner wall of the combustion chamber 1 which is less susceptible to heat damage. Further, the cylindrical mixed flame is in a thermally self-insulated state, and thus a lowering of temperature due to heat dissipation does not occur and the gas treatment having a high combustion efficiency can be performed. Further, because the processing gas is normally diluted with $N_2$ gas or the like and is then introduced into the exhaust gas treatment apparatus, the processing gas containing $N_2$ gas is mixed with the oxidizing gas and combusted together, thus becoming slow combustion, and hence a local high-temperature part is not formed, thus suppressing generation of $NO_X$.

As described above, according to the embodiment, the inner wall of the combustion chamber 1 is less susceptible to heat damage by the thermally self-insulated effect of the cylindrical mixed flame of a mixture of the two kinds of gases which is distant from the inner wall of the combustion chamber 1. In the case where hydrogen of not less than 300 L/min is contained in the processing gas, a local high-temperature part is formed in the combustion chamber 1 even in the cylindrical mixed flame of a mixture of the two kinds of the processing gas and the oxidizing gas, and thus the combustion chamber 1 is potentially led to heat damage. In such a case, by injecting cooling water in proper quantity into the oxidizing gas, the heat damage of the combustion chamber 1 can be prevented while ensuring the gas treatment performance. This configuration will be described below.

Figure 3:
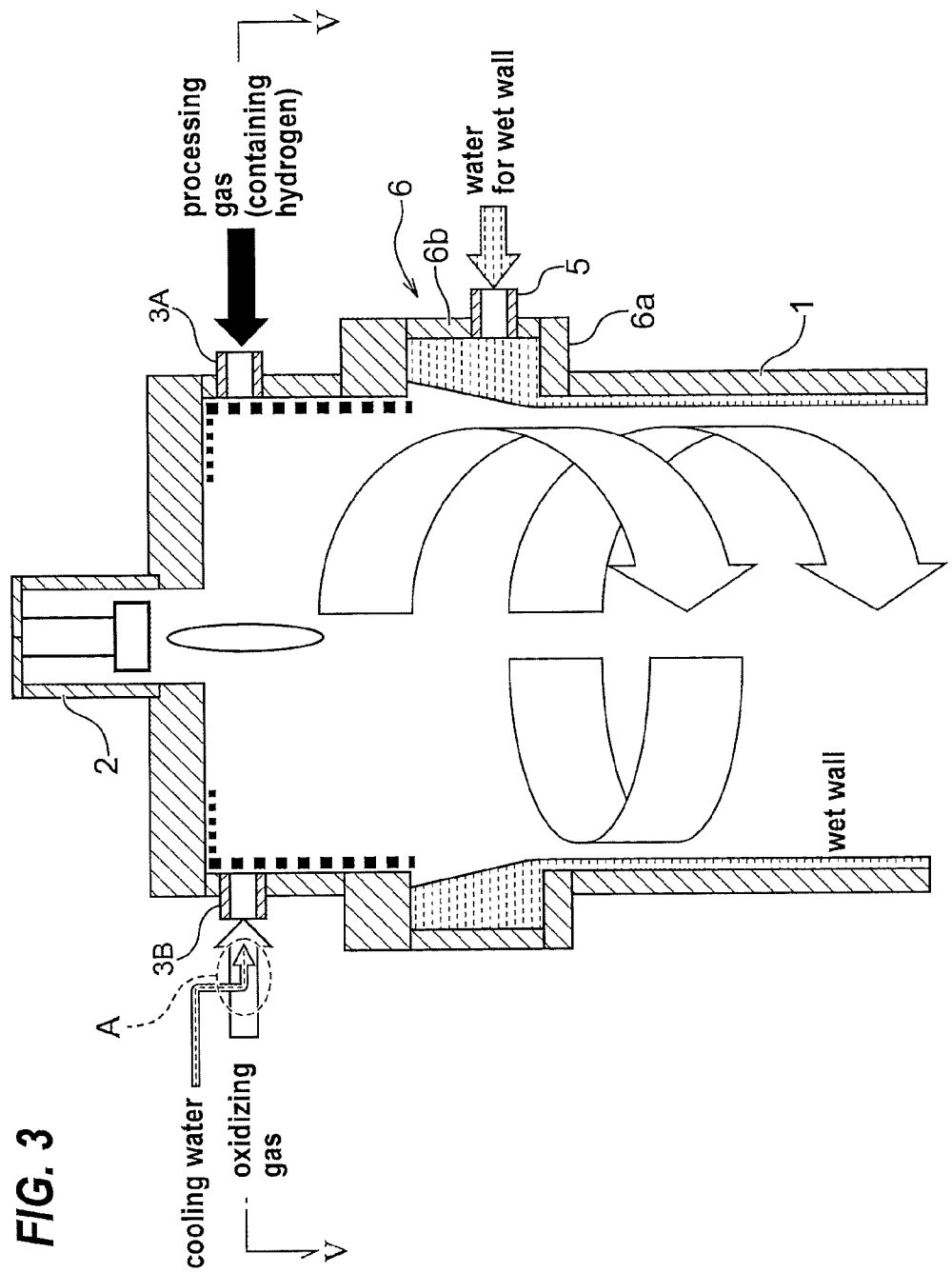
FIG. 3 is a schematic cross-sectional view showing a combustion chamber having a configuration for injecting cooling water into an oxidizing gas.

FIG. 3 is a schematic cross-sectional view showing a combustion chamber having a configuration for injecting cooling water into the oxidizing gas. As shown in FIG. 3, cooling water merges into the oxidizing gas, and the oxidizing gas containing water droplets of cooling water is blown into the combustion chamber 1. As the cooling water, city water is used, but alkaline water (water solution of sodium hydroxide, potassium hydroxide or the like) may be used.

Figure 4:
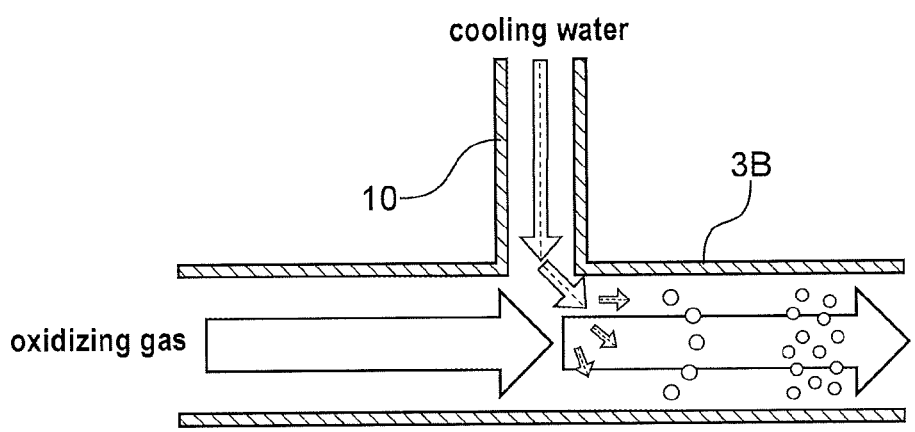
FIG. 4 is an enlarged view of A part of FIG. 3.
Figure 5:
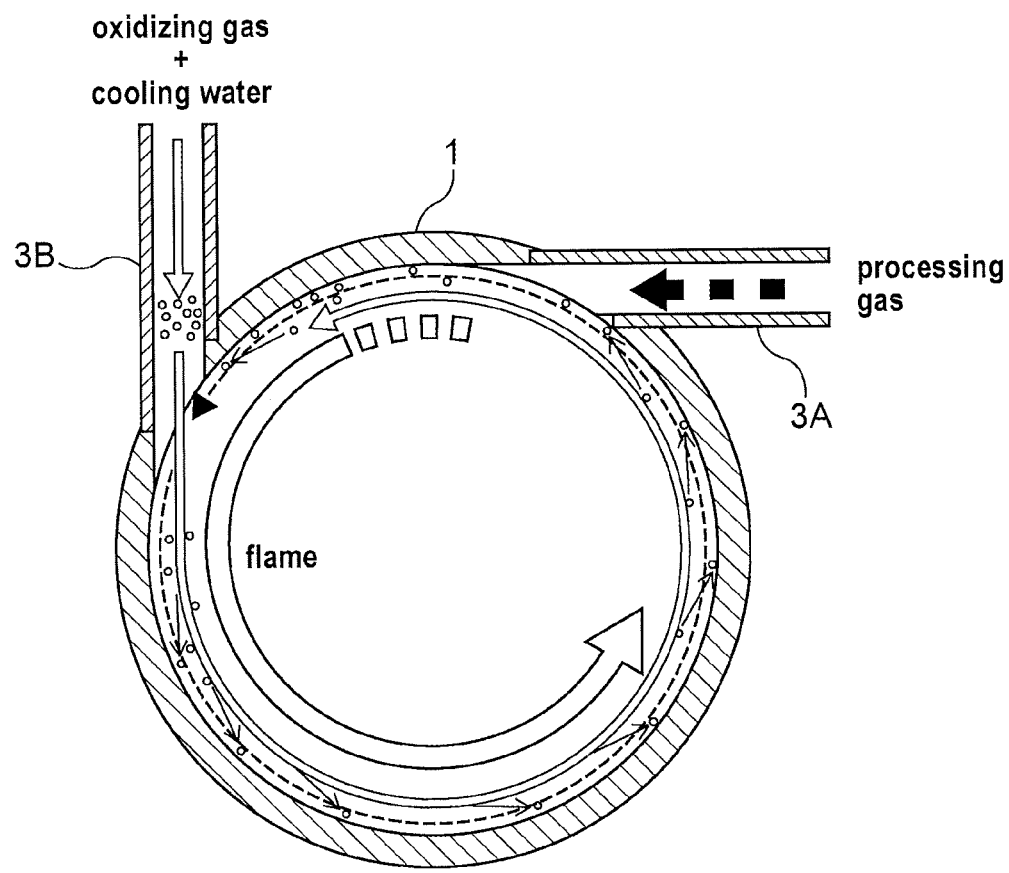
FIG. 5 is a cross-sectional view taken along line V-V of FIG. 3.

FIG. 4 is an enlarged view of A part of FIG. 3. FIG. 5 is a cross-sectional view taken along line V-V of FIG. 3. As shown in FIG. 4, a cooling water supply pipe 10 is connected to the oxidizing gas nozzle 3B, whereby cooling water merges into the oxidizing gas, and the oxidizing gas containing water droplets of cooling water is blown into the combustion chamber 1. The flow velocity of the oxidizing gas at a junction where the cooling water supply pipe 10 merges into the oxidizing gas nozzle 3B is several dozen meters per second (m/s). When the cooling water merges into a flow of the oxidizing gas, the cooling water becomes fine water droplets (by the same principle as an atomizer), and the water droplets move into a swirling flow of the gas in the combustion chamber and flows over the wall surface around the oxidizing gas port and the lower surface of the top board of the combustion chamber.

As shown in FIGS. 3 and 4, when the oxidizing gas containing the water droplets of cooling water and the processing gas are blown into the combustion chamber 1, respectively, in a tangential direction to the inner circumferential surface of the combustion chamber 1, a cylindrical mixed flame of a mixture of the two kinds of gases which is distant from the inner wall of the combustion chamber 1 is formed. The cylindrical mixed flame is formed in an axial direction of the combustion chamber 1. By blowing the two kinds of gases, respectively, in a tangential direction, a distribution in which the two kinds of unburned gases mixed together and having a heavy weight and a low temperature are positioned at an outer part of the cylindrical mixed flame, and a gas having a light weight and a high temperature after the two kinds of gases mixed together are burned is positioned at an inner part of the cylindrical mixed flame is formed by a swirling centrifugal force. Therefore, the cylindrical mixed flame becomes in a state where the cylindrical mixed flame is covered with the two kinds of unburned gases mixed together and having a low temperature and is thus thermally self-insulated, and hence the combustion flame is not brought in direct contact with the inner wall of the combustion chamber 1 which is less susceptible to heat damage. Further, the cylindrical mixed flame is in a thermally self-insulated state, and thus a lowering of temperature due to heat dissipation does not occur and the gas treatment having a high combustion efficiency can be performed.

On the other hand, because the water droplets of cooling water are heavier than the gases, as shown in FIG. 5, the water droplets of cooling water circle around the location closer to the wall surface than the two kinds of unburned gases mixed together in the cylindrical mixed flame (as shown by dotted circles in FIG. 5), thus not becoming an obstacle to combustion. Then, the water droplets of cooling water cool the area close to the inner wall of the combustion chamber 1 during circling. Thus, even if a large amount of hydrogen is contained in the processing gas, hydrogen in the processing gas is not rapidly combusted and a local high-temperature part is not formed in the combustion chamber 1, and thus heat damage of the combustion chamber 1 can be prevented.

Figure 6:
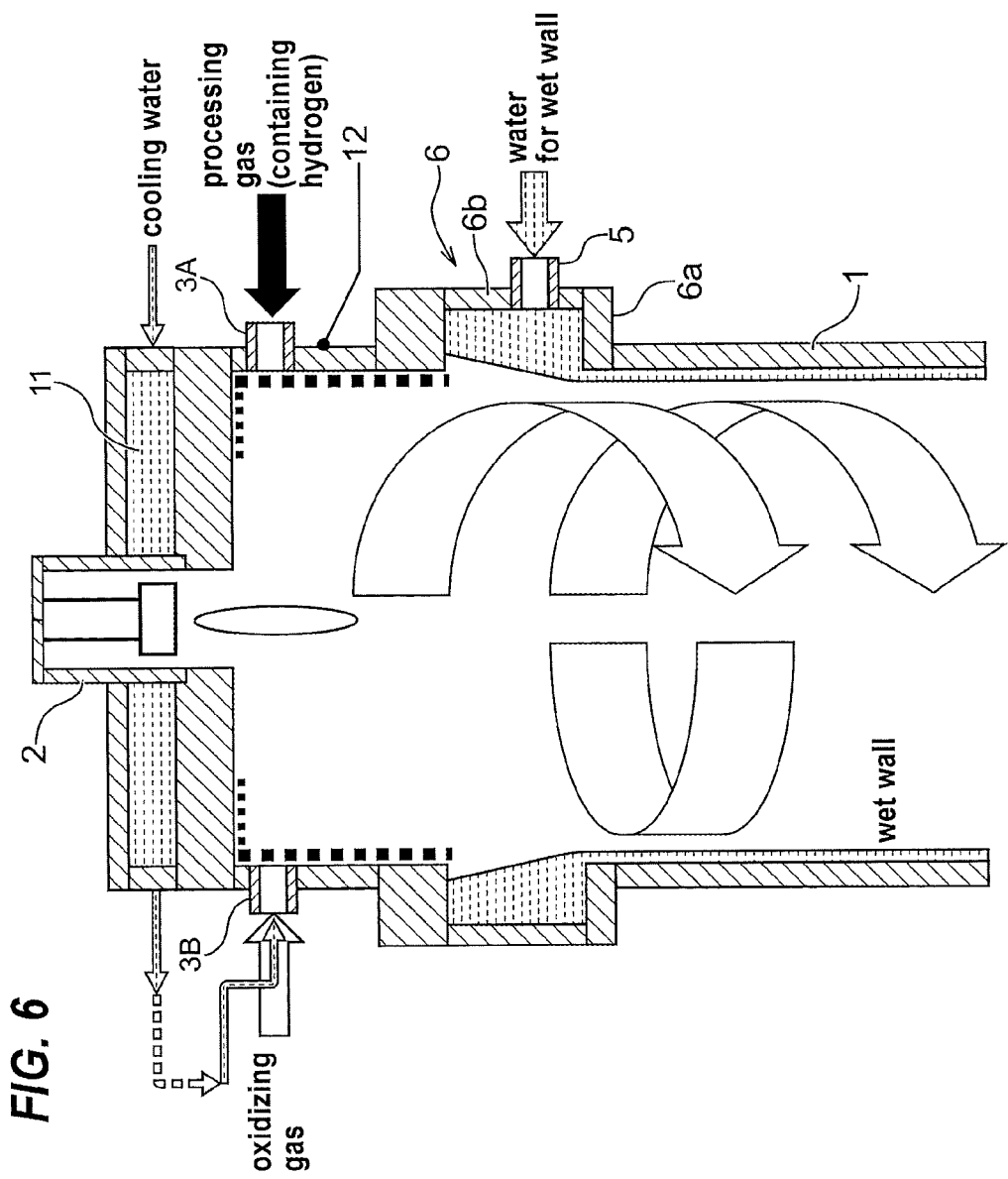
FIG. 6 is a schematic cross-sectional view showing an embodiment in which a cooling jacket is provided in a top board of a combustion chamber.

FIG. 6 is a schematic cross-sectional view showing an embodiment in which a cooling jacket is provided in a top board of a combustion chamber. As shown in FIG. 6, the combustion chamber 1 has a cooling jacket 11 in the interior of the top board, and cooling water is supplied into the cooling jacket 11 to cool the top board indirectly. The cooling water discharged from the cooling jacket 11 is supplied to the cooling water supply pipe 10 and is then blown into the combustion chamber 1 (see FIG. 4). Specifically, the cooling water is used for indirect cooling of the top board of the combustion chamber and is then blown into the combustion chamber to cool the area close to the upper inner wall of the combustion chamber.

The present inventors have conducted treatment experiments of hydrogen gas using the exhaust gas treatment apparatus shown in FIG. 6. The treatment experiments were conducted in the case where only the oxidizing gas was supplied (no supply of cooling water) and in the case where the oxidizing gas and cooling water were supplied (supply of cooling water), and the temperatures of the outer wall of the combustion chamber were measured by a thermocouple 12 during gas treatment.

Before conducting experiments, composition of a processing gas and a flow rate of the processing gas were set as shown in table 1 below on the assumption that the processing gas flowing into the exhaust gas treatment apparatus was an exhaust gas of the EUV exposure equipment.

TABLE 1

|  | hydrogen L/min | $N_2$ L/min |
|---|---|---|
| maximum flow rate of hydrogen | 620 | 200 |
| minimum flow rate of hydrogen | 120 | 200 |

A minimum necessary amount of oxidizing gas (amount of air) with respect to the maximum flow rate of hydrogen under conditions of table 1 was set, and it was estimated whether combustible concentration of hydrogen was ensured at the minimum flow rate of hydrogen while the set amount of oxidizing gas (amount of air) was fixed. The estimation result is shown in table 2.

TABLE 2

|  | hydrogen L/min | requisite amount of combustion air L/min | actual amount of combustion air L/min | $N_2$ L/min | hydrogen concentration % |
|---|---|---|---|---|---|
| maximum flow rate of hydrogen | 620 | 1771 | 1771 | 200 | 24 |
| minimum flow rate of hydrogen | 120 | 343 | 1771 | 200 | 5.7 |

It has been found that the hydrogen concentration exceeds 4% which is a lower limit of combustible concentration even at the minimum flow rate of hydrogen, and thus hydrogen can be combustible at the fixed amount of oxidizing gas even if the amount of hydrogen varies, on the known data.

Next, it has been verified that by supplying the processing gas and the oxidizing gas to the actual exhaust gas treatment apparatus under the conditions of table 2, stable combustion can be carried out and the temperature of the combustion chamber can be kept at a safe temperature. The verification result is shown in table 3.

TABLE 3

|  |  | hydrogen L/min | $N_2$ L/min | combustion air L/min | temperature outside of the combustion chamber ° C. |
|---|---|---|---|---|---|
| supply of cooling water | maximum flow rate of hydrogen | 620 | 200 | 1771 | 60 |
|  | medium flow rate of hydrogen | 370 | 200 | 1771 | 35 |
|  | minimum flow rate of hydrogen | 120 | 200 | 1771 | 30 |
| no supply of cooling water | maximum flow rate of hydrogen | 620 | 200 | 1771 | >250 |
|  | medium flow rate of hydrogen | 370 | 200 | 1771 | 180 |
|  | minimum flow rate of hydrogen | 120 | 200 | 1771 | 50 |

As can be seen from table 3, a temperature increase of the combustion chamber can be considerably suppressed by the thermally self-insulated effect obtained by the cylindrical mixed flame even in the case of no supply of cooling water, but it is preferable to supply cooling water in addition to the thermally self-insulated effect obtained by the cylindrical mixed flame at the maximum flow rate of hydrogen (620 L/min).

Figure 7:
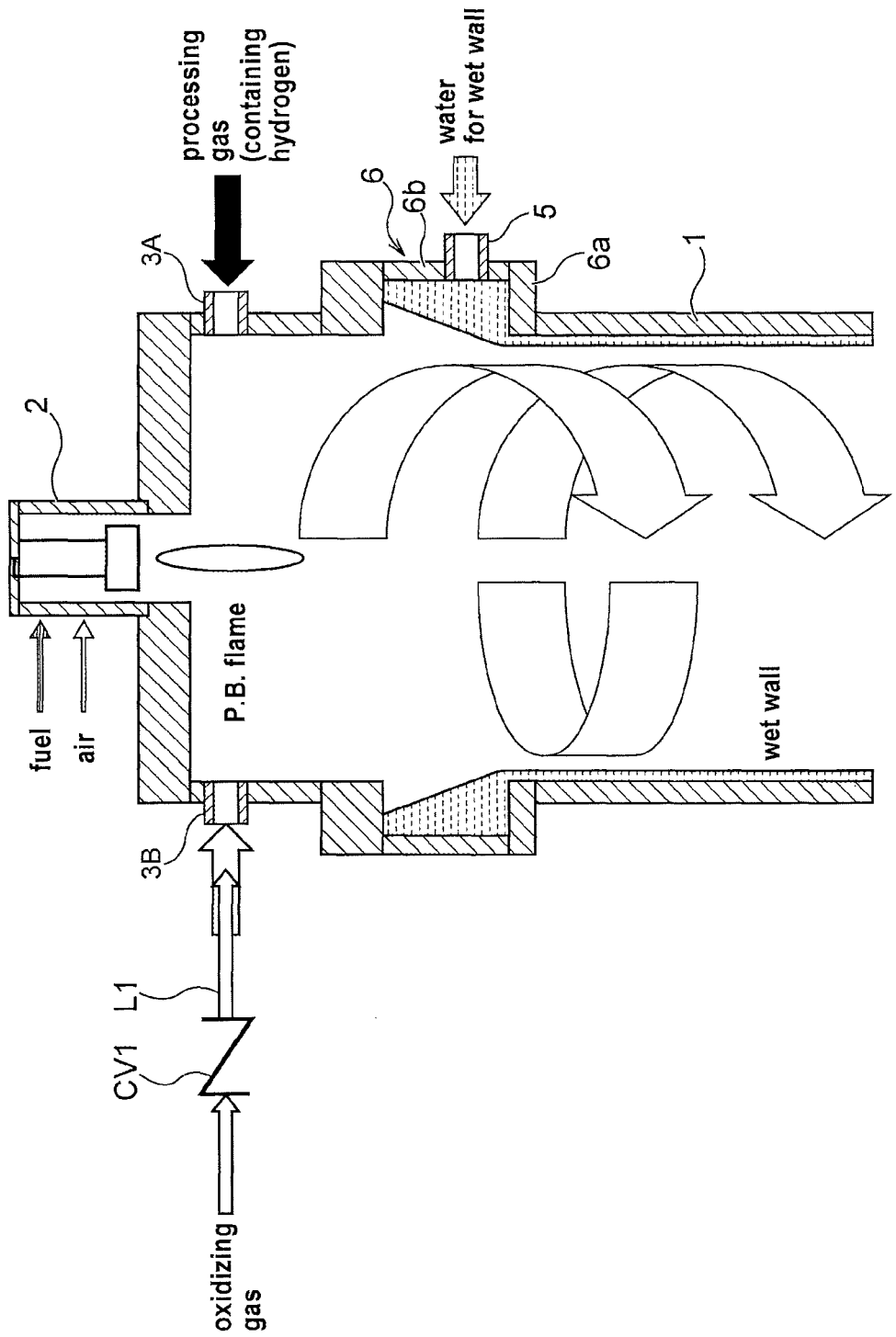
FIG. 7 is a schematic cross-sectional view showing an embodiment in which a check valve is provided in an oxidizing gas supply line of the exhaust gas treatment apparatus shown in FIG. 1.

FIG. 7 is a schematic cross-sectional view showing an embodiment in which a check valve is provided in an oxidizing gas supply line of the exhaust gas treatment apparatus shown in FIG. 1. As shown in FIG. 7, a check valve CV1 is provided in an oxidizing gas supply line L1 for supplying the oxidizing gas to the oxidizing gas nozzle 3B, whereby unburned processing gas in the combustion chamber 1 is prevented from flowing back into the oxidizing gas supply line L1.

Figure 8:
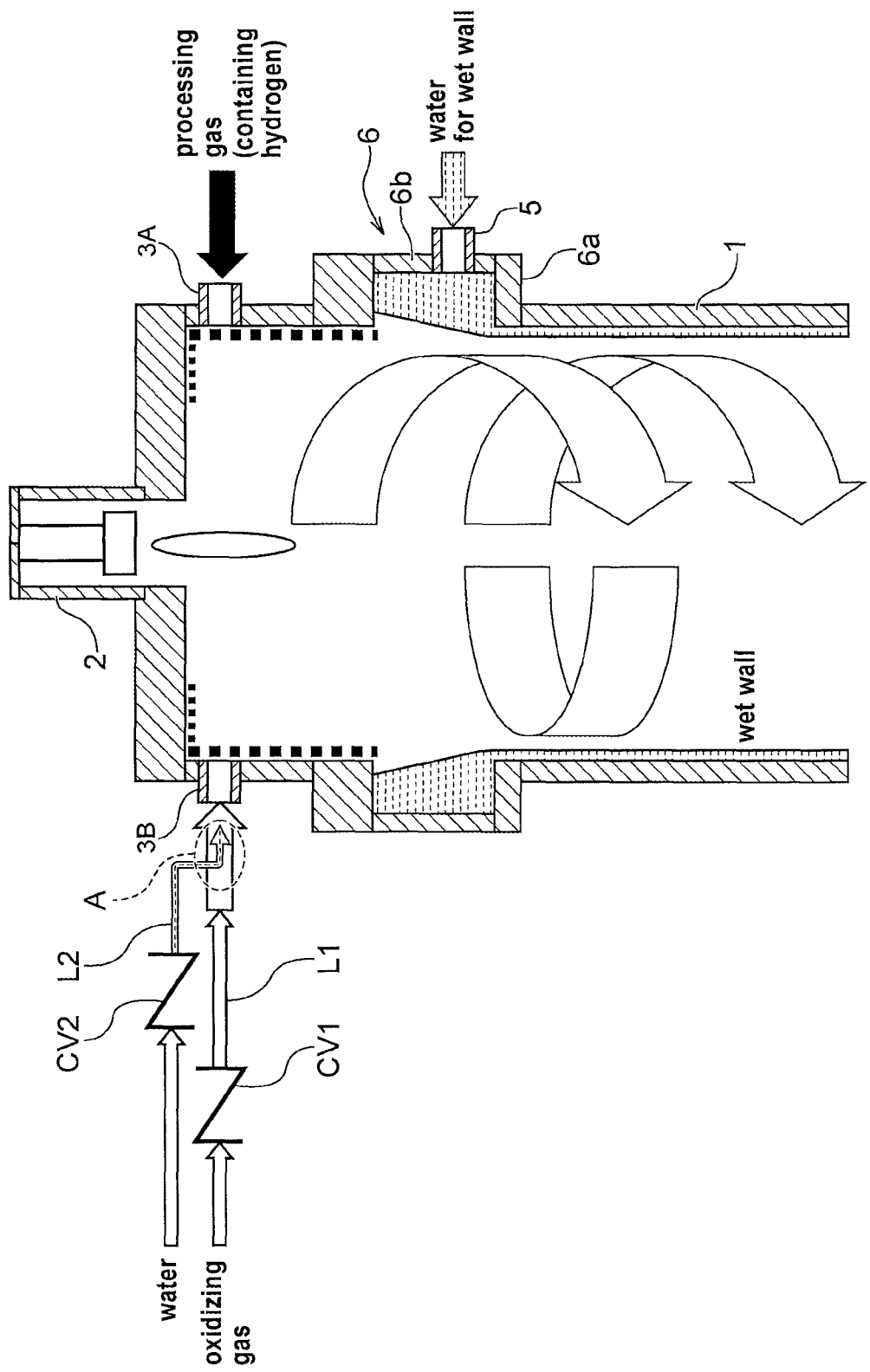
FIG. 8 is a schematic cross-sectional view showing an embodiment in which check valves are provided in an oxidizing gas supply line and a cooling water supply line, respectively, of the exhaust gas treatment apparatus shown in FIG. 3.

FIG. 8 is a schematic cross-sectional view showing an embodiment in which check valves are provided in an oxidizing gas supply line and a cooling water supply line, respectively, of the exhaust gas treatment apparatus shown in FIG. 3. As shown in FIG. 8, a check valve CV1 is provided in an oxidizing gas supply line L1 for supplying the oxidizing gas to the oxidizing gas nozzle 3B and a check valve CV2 is provided in a cooling water supply line L2 for supplying cooling water to the oxidizing gas nozzle 3B, whereby unburned processing gas in the combustion chamber 1 is prevented from flowing back into the oxidizing gas supply line L1 and the cooling water supply line L2.

Figure 9:
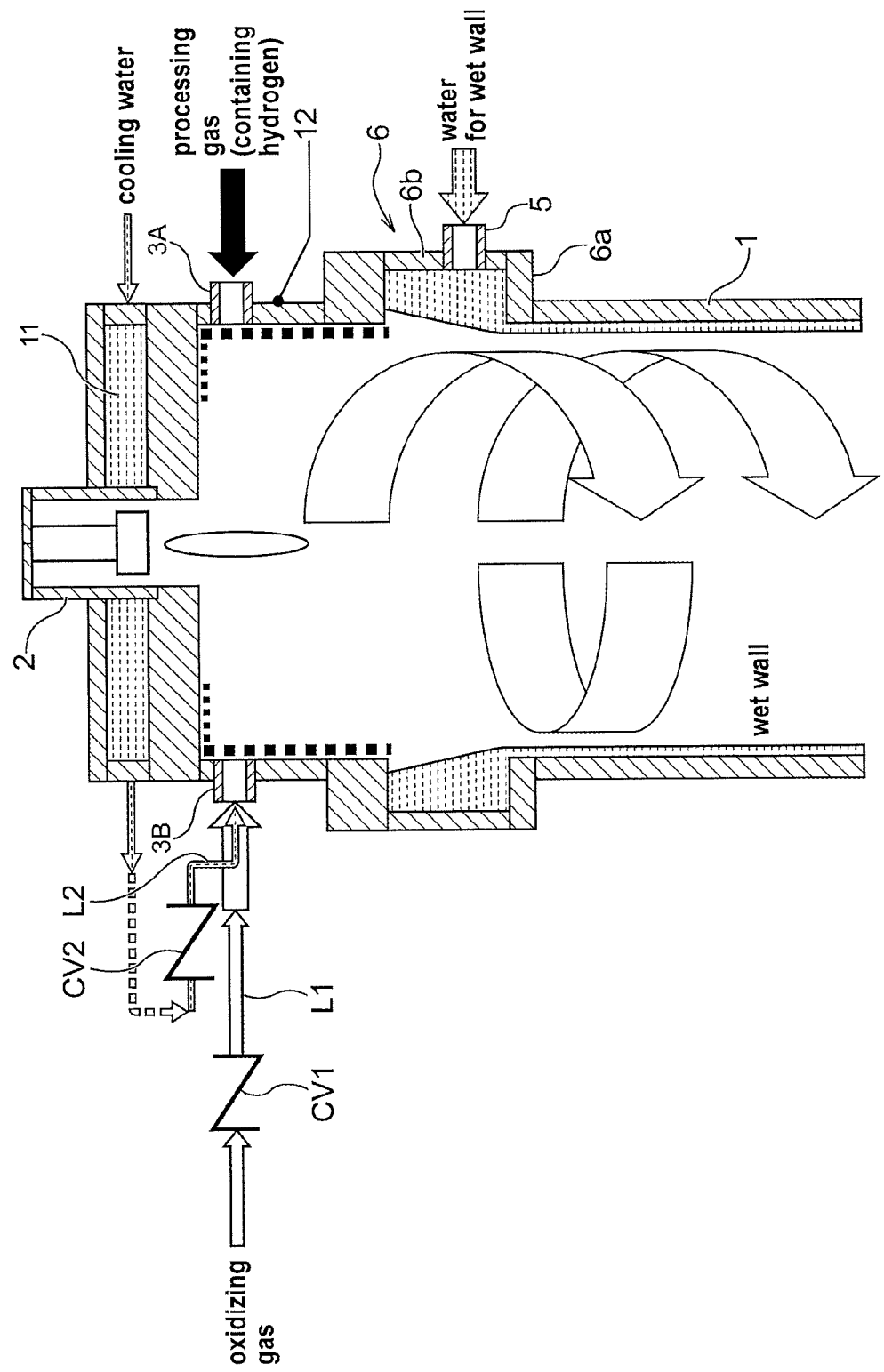
FIG. 9 is a schematic cross-sectional view showing an embodiment in which check valves are provided in an oxidizing gas supply line and a cooling water supply line, respectively, of the exhaust gas treatment apparatus shown in FIG. 6.

FIG. 9 is a schematic cross-sectional view showing an embodiment in which check valves are provided in an oxidizing gas supply line and a cooling water supply line, respectively, of the exhaust gas treatment apparatus shown in FIG. 6. As shown in FIG. 9, a check valve CV1 is provided in an oxidizing gas supply line L1 for supplying the oxidizing gas to the oxidizing gas nozzle 3B and a check valve CV2 is provided in a cooling water supply line L2 for supplying cooling water from the cooling jacket 11 to the oxidizing gas nozzle 3B, whereby unburned processing gas in the combustion chamber 1 is prevented from flowing back into the oxidizing gas supply line L1 and the cooling water supply line L2.

The check valve CV1 or CV2 used in the embodiments shown in FIGS. 7 through 9 is a valve configured to allow a fluid in a pipe to flow only in one direction, and is a valve in which a valve element is operated under a force caused by a pressure difference between an upstream side and a downstream side and the valve element is promptly pressed against a valve seat to prevent countercurrent when the pressure difference becomes the reverse of right current. The check valve CV1 or CV2 is preferably a swing-type check valve in which a flat plate-shaped valve element is swung or a ball-type check valve in which a ball-shaped valve element moves in a reciprocating manner.

Although certain preferred embodiments of the present invention have been shown and described in detail, it should be understood that various changes and modifications may be made without departing from the scope of the appended claims.

What is claimed is:

1. An exhaust gas treatment apparatus for treating a processing gas containing hydrogen by combustion treatment to make the processing gas harmless, the exhaust gas treatment apparatus comprising:
    a cylindrical combustion chamber configured to combust a processing gas containing hydrogen; and
    a processing gas nozzle and an oxidizing gas nozzle provided on the combustion chamber and configured to blow the processing gas and an oxidizing gas, respectively, in a tangential direction to an inner circumferential surface of the combustion chamber;
    wherein the processing gas nozzle and the oxidizing gas nozzle are positioned in the same plane perpendicular to an axis of the combustion chamber,
    wherein a cooling water supply pipe is connected to the oxidizing gas nozzle, and the oxidizing gas is blown together with cooling water in the tangential direction to the inner circumferential surface of the combustion chamber from the oxidizing gas nozzle.

2. The exhaust gas treatment apparatus according to claim 1, wherein the cooling water is turned into water droplets by allowing the cooling water supplied from the cooling water supply pipe to merge into the oxidizing gas flowing in the oxidizing gas nozzle, and the oxidizing gas containing the water droplets of the cooling water is blown into the combustion chamber.

3. The exhaust gas treatment apparatus according to claim 1, further comprising a cooling jacket provided in an upper wall of the combustion chamber and configured to cool the upper wall by supplying cooling water.

4. The exhaust gas treatment apparatus according to claim 3, wherein the cooling water discharged from the cooling jacket is supplied to the cooling water supply pipe.

5. The exhaust gas treatment apparatus according to claim 1, wherein a check valve is provided in an oxidizing gas supply line for supplying the oxidizing gas to the oxidizing gas nozzle to prevent the processing gas in the combustion chamber from flowing back into the oxidizing gas supply line.

6. The exhaust gas treatment apparatus according to claim 1, wherein a check valve is provided in the cooling water supply pipe to prevent the processing gas in the combustion chamber from flowing back into the cooling water supply pipe.

7. The exhaust gas treatment apparatus according to claim 1, wherein the processing gas containing hydrogen comprises an exhaust gas discharged from an EUV exposure equipment.

8. An exhaust gas treatment method for treating a processing gas containing hydrogen by combustion treatment to make the processing gas harmless, the exhaust gas treatment method comprising:
    providing a cylindrical combustion chamber for combusting a processing gas containing hydrogen; and
    blowing the processing gas and an oxidizing gas, respectively, in a tangential direction to an inner circumferential surface of the combustion chamber from a processing gas nozzle and an oxidizing gas nozzle positioned in the same plane perpendicular to an axis of the combustion chamber to form a swirling flow of a mixture of two kinds of the processing gas and the oxidizing gas,
    wherein cooling water is supplied to the oxidizing gas nozzle, whereby the oxidizing gas is blown together with the cooling water in the tangential direction to the inner circumferential surface of the combustion chamber from the oxidizing gas nozzle.

9. The exhaust gas treatment method according to claim 8, wherein the cooling water is turned into water droplets by allowing the cooling water to merge into the oxidizing gas flowing in the oxidizing gas nozzle, and the oxidizing gas containing the water droplets of the cooling water is blown into the combustion chamber.

10. The exhaust gas treatment method according to claim 8, wherein cooling water is supplied into an upper wall of the combustion chamber to cool the upper wall.

11. The exhaust gas treatment method according to claim 10, wherein the cooling water after cooling the upper wall of the combustion chamber is supplied to the oxidizing gas nozzle.

12. The exhaust gas treatment method according to claim 8, wherein the processing gas containing hydrogen comprises an exhaust gas discharged from an EUV exposure equipment.

13. The exhaust gas treatment method according to claim 8, wherein water is supplied from a water supply nozzle at a location distant in an axial direction of the combustion chamber from a blowing position of the processing gas and the oxidizing gas to form a water film on the inner circumferential surface of the combustion chamber.

14. The exhaust gas treatment method according to claim 13, wherein the water is ejected in a tangential direction to the inner circumferential surface of a water reservoir from the water supply nozzle to form a water film comprising a swirling flow having a water surface which is inclined obliquely downward from a radially outer side toward a radially inner side.

* * * * *